United States Patent
Baba (10) Patent No.: US 8,774,415 B2
(45) Date of Patent: Jul. 8, 2014

(54) KEY SHARING DEVICE, KEY SHARING METHOD, AND COMPUTER PROGRAM PRODUCT

(75) Inventor: Shinichi Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/545,181

(22) Filed: Jul. 10, 2012

(65) Prior Publication Data

US 2013/0051559 A1 Feb. 28, 2013

(30) Foreign Application Priority Data

Aug. 26, 2011 (JP) ................................. 2011-184956

(51) Int. Cl.
*H04L 9/08* (2006.01)
*H04L 29/06* (2006.01)

(52) U.S. Cl.
CPC .............. *H04L 9/083* (2013.01); *H04L 63/062* (2013.01)
USPC .......................................................... 380/279

(58) Field of Classification Search
None
See application file for complete search history.

(56) References Cited

U.S. PATENT DOCUMENTS

| 2002/0097877 A1* | 7/2002 | Tanimoto ...................... 380/277 |
| 2003/0099361 A1* | 5/2003 | Uchida ......................... 380/277 |
| 2009/0276620 A1* | 11/2009 | McCarron et al. ............. 713/155 |

OTHER PUBLICATIONS

Maurhart, O., "QKD Networks Based on Q3P," Lect. Notes Phys. 797, pp. 151-171 (2010).

* cited by examiner

*Primary Examiner* — David Le
(74) *Attorney, Agent, or Firm* — Finnegan, Henderson, Farabow, Garrett & Dunner, L.L.P.

(57) ABSTRACT

In an embodiment, a key sharing device connects to external devices with paths, and includes a key storage unit, a determining unit, a first generating unit, an encrypting unit, and a first transmitting unit. The key storage unit stores cryptographic keys to be shared. The determining unit determines a path for reaching a first device via a second device when a number of the cryptographic keys out of the cryptographic keys stored in the key storage unit is a predetermined threshold or smaller. The first generating unit generates an initial key that is a new cryptographic key to be shared with the first device. The encrypting unit encrypts the initial key by using the cryptographic key. The first transmitting unit transmits the encrypted initial key to the second device with addressing the first device as destination.

8 Claims, 6 Drawing Sheets

KEY SHARING DEVICE, KEY SHARING METHOD, AND COMPUTER PROGRAM PRODUCT

CROSS-REFERENCE TO RELATED APPLICATION

This application is based upon and claims the benefit of priority from Japanese Patent Application No. 2011-184956, filed on Aug. 26, 2011; the entire contents of which are incorporated herein by reference.

FIELD

An embodiment described herein relates generally to a key sharing device, a key sharing method and a computer program product.

BACKGROUND

A research project relating to quantum cryptographic communication called secure communication based on quantum cryptography (SECOQC) is known. In SECOQC, have been proposed techniques such as functions generated through distribution of quantum cryptographic keys and used for key exchange based on random numbers distributed and stored in a plurality of nodes, and a protocol named Q3P (quantum point to point protocol).

With the techniques of related art, however, in a case where a node is added or in a case where random numbers are excessively consumed in a node and the node can no longer be used, such node has to be resumed manually. Specifically, in such cases, a key for initial authentication, for example, needs to be set manually by an administrator.

DETAILED DESCRIPTION

According to an embodiment, a key sharing device is connected to a plurality of external devices through one or more paths, and includes a key storage unit, a determining unit, a first generating unit, an encrypting unit, and a first transmitting unit. The key storage unit is configured to store cryptographic keys to be shared with the external devices. The determining unit is configured to determine a path for reaching a first device included among the external devices via a second device included among the external devices when a number of the cryptographic keys to be shared with the first device out of the cryptographic keys stored in the key storage unit is a predetermined threshold or smaller. The first generating unit is configured to generate an initial key that is a new cryptographic key to be shared with the first device. The encrypting unit is configured to encrypt the initial key by using the cryptographic key shared with the second device. The first transmitting unit is configured to transmit the encrypted initial key to the second device with addressing the first device as destination.

A preferred embodiment of a key sharing device will be described below in detail with reference to the accompanying drawings.

Figure 1:
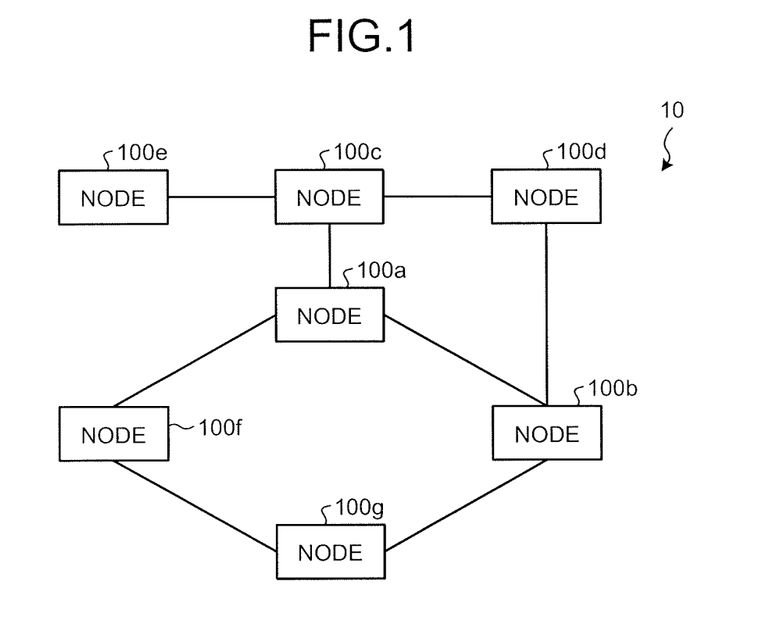
FIG. 1 is a diagram illustrating an exemplary configuration of a communication system according to an embodiment.

First, a communication system including the key sharing device according to the embodiment will be described. FIG. 1 is a diagram illustrating an exemplary configuration of a communication system 10 according to the embodiment. The communication system 10 includes a plurality of nodes 100a to 100g that are key sharing devices. Since the nodes 100a to 100g have the same configuration, the nodes will be simply referred to as nodes 100 when the nodes need not be distinguished from one another. The number of nodes 100 is not limited to seven.

Each node 100 has a function of generating a cryptographic key (random number) for secure communication and storing the cryptographic key in the node 100. The node 100 realizes this function by continuously generating random numbers shared with another node 100 that is an external device, for example. The quantum cryptographic key distribution mentioned above or the like can be applied as a method for continuously generating random numbers to be shared. Usually, in the quantum cryptographic key distribution, part of the generated random numbers is used as a cryptographic key shared for communication between the nodes 100. The method that can be applied is not limited to the quantum cryptographic key distribution. Any method capable of generating random numbers (cryptographic keys) to be shared and storing the keys in each of the nodes sharing the keys can be applied.

When the quantum cryptographic key distribution is used, communication channels for the quantum cryptographic key distribution such as optical fibers are provided between the nodes 100 in FIG. 1. In addition, communication lines such as the Internet are also provided between the nodes 100.

Figure 2:
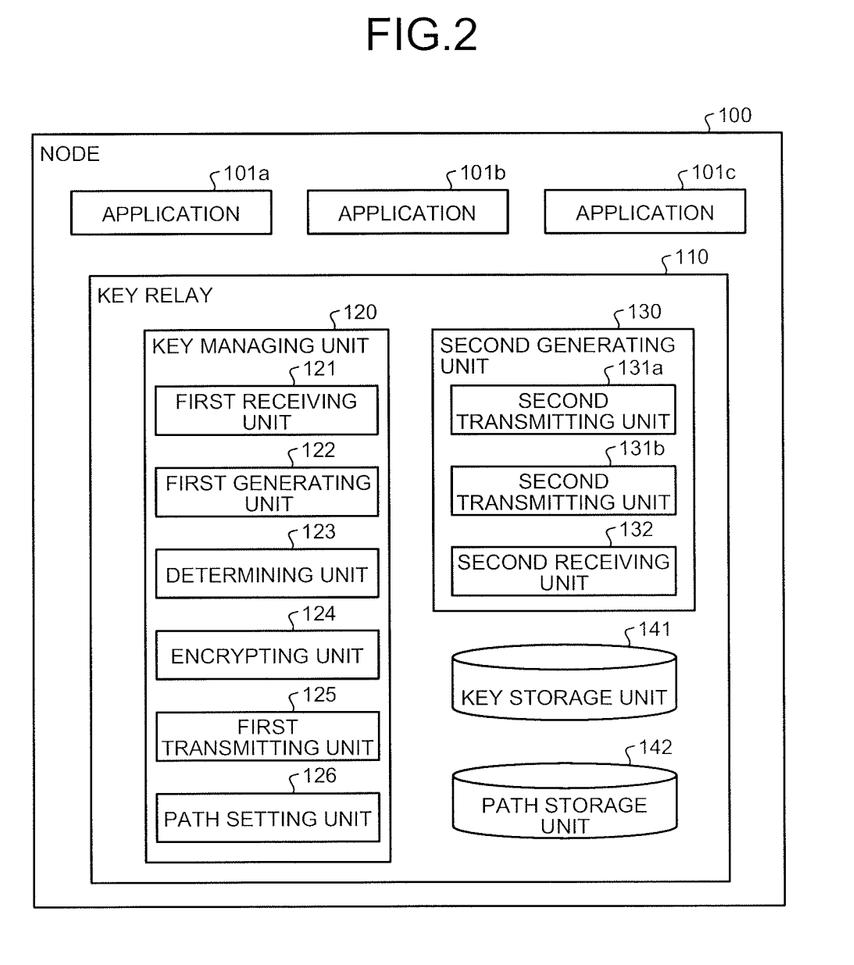
FIG. 2 is a block diagram of a node according to the embodiment.

FIG. 2 is a block diagram illustrating an example of a configuration of the node 100 according to the embodiment. As illustrated in FIG. 2, the node 100 includes a plurality of applications 101a, 101b and 101c, and a key relay 110. The applications 101a to 101c will be simply referred to as applications 101 when the applications need not be distinguished from one another. The number of applications 101 is not limited to three.

The applications 101 are, for example, software programs having functions for communicating with another node 100 by using a cryptographic key. The applications 101 are read from a storage medium such as a ROM (not illustrated) and executed by a CPU (not illustrated) in the node 100, for example. Alternatively, the applications 101 may be executed by a device other than the node 100.

The key relay 110 includes a key managing unit 120, a second generating unit 130, a key storage unit 141 and a path storage unit 142.

The key managing unit 120 manages keys used by the applications 101. For example, the key managing unit 120 generates a cryptographic key (hereinafter referred to as an application cryptographic key) to be shared between the key managing unit 120 (hereinafter referred to as a key managing unit B) of another node 100 (hereinafter referred to as a node B) in which an application to communicate with is present in response to a request from the application 101 that requires a cryptographic key.

The key managing unit 120 that has received the request from the application 101 provides a random number sequence to be used as the application cryptographic key. In a case of an application cryptographic key for the AES cipher system, for example, the key managing unit 120 takes out a random number of 256 bits from random numbers stored in the key storage unit 141 and shared with the node B, and responds to the application 101. The key managing unit 120 also informs the key managing unit B of specification information (such as identification information and a taken range of the random number) specifying the application cryptographic key.

The application 101 requests the key managing unit 120 to generate a secure application cryptographic key at each communication, for example. Generation of an application cryptographic key at each communication is required, for example, in a case of communication using the one-time pad cipher that cannot be decrypted by the third party in a theoretical manner. Accordingly, the consumption of application cryptographic keys may be increased with an increase in communication volume and the shared random numbers may be exhausted. If the shared random numbers are exhausted, the method of sharing the random numbers cannot be performed since the method includes a procedure of using the random numbers for mutual authentication or the like, and the sharing of the random numbers is stopped.

When the random number sharing function is stopped under such circumstances as a case where the random numbers to be shared with the node B are exhausted or a case where no random number is shared with the node B, the key managing unit 120 generates a new random number (hereinafter referred to as an initial key) to be shared with the node B so as to initiate or resume the random number sharing function. The key managing unit 120 encrypts the generated initial key by using the random number shared with another node 100 (hereinafter referred to as a node C). The key managing unit 120 then transmits the encrypted initial key to the node C addressing the node B as destination. The node C decrypts the encrypted initial key with the random number shared with the source node 100. Such a process is repeated until the initial key reaches the key managing unit B of the node B. As a result, it is possible to share the initial key with the key managing unit B of the node B.

The initial key is used for initiating or resuming continuous generation of random numbers to be shared with the node B through the quantum cryptographic key distribution, for example. In the quantum cryptographic key distribution, the transmitting end and the receiving end check (verify) the random number with each other after generation of the random number. The initial key is required as a key for mutual authentication in this process (that is, the mutual authentication has not been possible and sharing of random numbers has been stopped while the random numbers to be shared have been exhausted).

The second generating unit 130 generates random numbers to be shared (random numbers that are seeds of cryptographic keys to be shared) with another node 100. The second generating unit 130 continuously generates random numbers to be shared through the quantum cryptographic key distribution described above, for example. Details of the second generating unit 130 will be described later.

The key storage unit 141 stores random numbers generated by the second generating unit 130. The key storage unit 141 stores a random number, sharing node information that is information for identifying another node 100 with which the random number is shared and random number identification information for identifying the random number in association with one another, for example.

A random number stored in the key storage unit 141 is used as a key for authentication with the node 100 with which the random number is shared, as a key for the one-time pad cipher that ensures absolute security in transmitting key information to be used by the application 101 to an adjacent node 100, or the like. It is therefore necessary to allow an arbitrary length from an arbitrary point of the stored random numbers to be used as a key depending on the node with which the key is shared. The random numbers are thus stored with the sharing node information and the random number identification information. The sharing node information includes an IP address of the sharing node added further with 8-bit additional information, for example.

The path storage unit 142 stores path information representing a path for communication with another node 100. The path information includes information similar to a routing table used for the Internet or the like, for example. Specifically, the path information includes an ID of a network to which a destination node 100 belongs and a node 100 (next hop) to which data are initially transmitted for ultimately transmitting the data to the destination node 100, for example.

Next, an example of a detailed configuration of the key managing unit 120 will be described. The key managing unit 120 includes a first receiving unit 121, a first generating unit 122, a determining unit 123, an encrypting unit 124, a first transmitting unit 125, and a path setting unit 126.

The first receiving unit 121 receives information from other components such as the applications 101. For example, the first receiving unit 121 receives a request for an application cryptographic key from an application 101.

The first generating unit 122 generates a random number (application cryptographic key) to be shared with another node 100. The first generating unit 122, however, generates an initial key in a case where the number of cryptographic keys to be shared with another node 100 (first device) to communicate with that are stored in the key storage unit 141 is a predetermined threshold or smaller or in a case where the sharing of the random number is stopped under a predetermined condition caused by other shared cryptographic keys.

In a case where the number of cryptographic keys to be shared with a node 100 to communicate with is a predetermined threshold or smaller or in a case where a predetermined condition is fallen into because of other shared cryptographic keys, the determining unit 123 determines a path for reaching the node 100 to communicate with via a node 100 (second device) different from the node 100 to communicate with. The determining unit 123 determines a path for reaching the node 100 to communicate with and a node 100 to which data are first transmitted by referring to the path information stored in the path storage unit 142, for example.

The encrypting unit 124 encrypts the initial key by using a random number shared with the determined node 100. The encrypting unit 124 encrypts the initial key by using the one-time pad cipher, for example.

The first transmitting unit 125 transmits information to other components such as the applications 101. For example, the first transmitting unit 125 transmits an application cryptographic key to be shared with a node to communicate with to the application 101. The first transmitting unit 125 also transmits an initial key encrypted by the encrypting unit 124 to a node 100 to which data are to be first transmitted on the path determined by the determining unit 123.

The path setting unit 126 updates the path information and saves the updated information in the path storage unit 142. The path setting unit 126 updates the path information by a method similarly to update of a routing table used for the Internet, for example.

Next, an example of a detailed configuration of the second generating unit 130 will be described. The second generating unit 130 includes a second transmitting unit 131a, a second transmitting unit 131b and a second receiving unit 132. Since the second transmitting units 131a and 131b have the same functions, the second transmitting units will be simply referred to as second transmitting units 131 when these need not be distinguished from one another.

The second transmitting units 131 have functions as a transmitting end of the quantum cryptographic key distribution. The second receiving unit 132 has functions as a receiving end of the quantum cryptographic key distribution. In a case where the node 100a in FIG. 1 functions as a transmitting end of the quantum cryptographic key distribution with respect to the nodes 100b and 100c and functions as a receiving end of the quantum cryptographic key distribution with respect to the node 100f, for example, the key relay 110 of the node 100a includes two second transmitting units 131 (second transmitting units 131a and 131b) and one second receiving unit 132 as illustrated in FIG. 2. Thus, the numbers of the second transmitting units 131 and the second receiving unit 132 illustrated in FIG. 2 are exemplary only and change according to the number of nodes 100 to communicate with through the quantum cryptographic key distribution.

Figure 3:
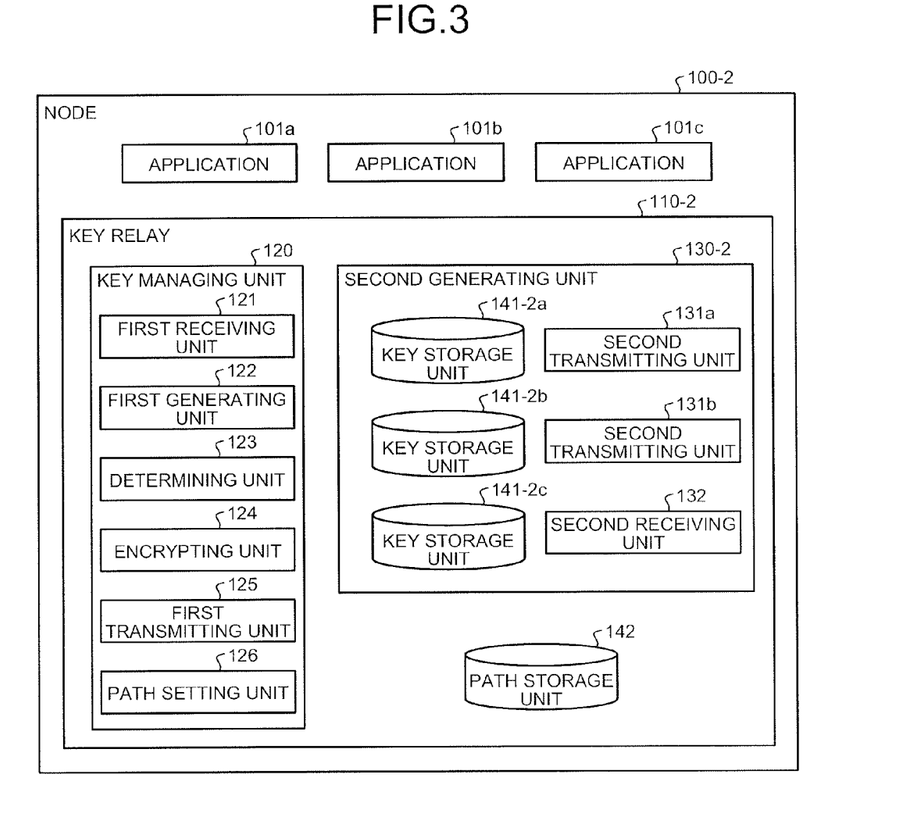
FIG. 3 is a block diagram of a node according to a modified example.

The node 100 may include the key storage unit 141 for each of other nodes 100 with which random numbers are shared. FIG. 3 is a block diagram illustrating an example of a configuration of a node 100-2 having such a configuration according to a modified example. As illustrated in FIG. 3, the node 100-2 is different from the configuration in FIG. 2 in the configuration of a second generating unit 130-2. Since the other functions and components are similar to those in FIG. 2, the description thereof will not be repeated here.

The second generating unit 130-2 includes key storage units 141-2a, 141-2b and 141-2c associated with the second transmitting unit 131a, the second transmitting unit 131b and the second receiving unit 132, respectively. For example, the key storage unit 141-2a stores a random number generated by the second transmitting unit 131a through the quantum cryptographic key distribution. In this case, the key storage unit 141-2a need not store sharing node information of a node 100 with which the second transmitting unit 131a communicates.

Alternatively, an associated key storage unit 141 may be included in the second transmitting unit 131 or the second receiving unit 132. With such a configuration, a main role of the key managing unit 120 is an interface between the applications 101 and the second generating unit 130 for generation of keys for the applications 101, and the key managing unit 120 can be simplified. In addition, the second transmitting units 131 and the second receiving unit 132 that save the random numbers only have to include mechanisms for hiding the random numbers therein, and the possibility that the random numbers be exposed outside of the device is thus reduced. It is therefore easier to enhance the security.

Figure 4:
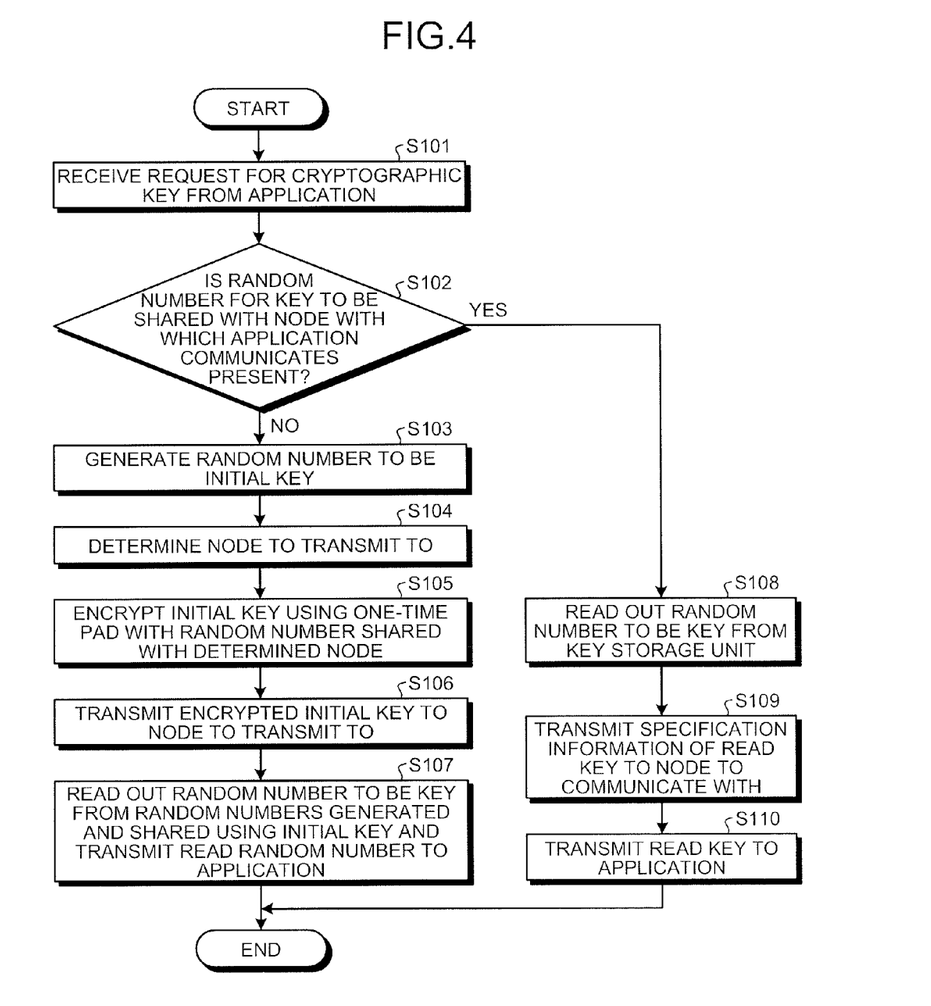
FIG. 4 is a flowchart illustrating an entire flow of a key sharing process according to the embodiment.

Next, a key sharing process performed by the node 100 having such a configuration according to the embodiment will be described with reference to FIG. 4. FIG. 4 is a flowchart illustrating an entire flow of the key sharing process according to the embodiment.

First, the first receiving unit 121 of the key managing unit 120 receives a request of an application cryptographic key from an application 101 (step S101). The first generating unit 122 determines whether or not a random number to be shared with another node 100 (referred to as a node B) that performs the application and that the application 101 communicates with is stored in the key storage unit 141 (step S102).

The first generating unit 122 recognizes that the present node has a function of sharing random numbers with the node B and, in this process, further determines whether or not the number of random numbers to be shared with the node B is 0 (=threshold) or smaller. The value 0 of the threshold is an example and may be a value of 1 or larger. Alternatively, the first generating unit 122 may determine whether or not a predetermined condition on the random numbers to be shared other than the number of the random numbers to be shared is fallen into. As a result, it is possible to prevent the random number sharing from being stopped because of complete exhaustion of random numbers and to further prevent occurrence of failures such as temporary suspension of service caused thereby.

In a case where the present node does not have a function of sharing random numbers with the node B, this operation is replaced by transferring the application cryptographic key generated by the first generating unit 122 to the node B via another node (referred to as a node D) that shares a random number with the present node. Thus, the process of this flowchart can be applied by replacing the node B in the following steps as the node D.

If the sharing function is stopped and no random number is stored (No in step S102), the first generating unit 122 generates a random number to be an initial key shared with the node B (step S103). The determining unit 123 refers to the path information in the path storage unit 142 and determines another node 100 (referred to as a node C) to which the initial key is to be transmitted (step S104). The encrypting unit 124 reads out a random number shared with the determined node C from the key storage unit 141 and encrypts the initial key with the read random number (step S105). The first transmitting unit 125 transmits the encrypted initial key to the node C addressing the node B as destination (step S106).

When the initial key reaches the node B, generation and sharing of the random number with the node B through the quantum cryptographic key distribution are initiated (the initial key is used for mutual authentication performed in this process). The first transmitting unit 125 transmits the application cryptographic key obtained from the random number thus generated and stored in the key storage unit 141 to the application 101 that is the request source (step S107).

If it is determined that a random number to be shared with the node B is stored in step S102 (Yes in step S102), the key managing unit 120 reads out part of the random number to be used as the application cryptographic key from the key storage unit 141 (step S108). The first transmitting unit 125 transmits specification information (such as identification information and a range of the application cryptographic key in the random number) of the read application cryptographic key to the node B (step S109). Since only the specification information is transmitted in this manner, the communication volume can be reduced. The first transmitting unit 125 transmits the read application cryptographic key to the application 101 that is the request source (step S110).

Next, an example of effects produced by a communication system using a key sharing device (node 100) according to the embodiment will be described. In the following, an example of communication between a node A and a node B that are any two of the nodes 100 will be described.

In a case where communication between a key managing unit 120 (referred to as a key managing unit A) of the node A and a key managing unit 120 (referred to as a key managing unit B) of the node B is performed, authentication is performed periodically or as necessary so as to confirm that the node to communicate with is not masquerading even if the key managing unit A and the key managing unit B can communicate directly with each other. If there is a necessary amount of shared random numbers in the key storage unit 141, the random numbers are used for authentication. If no random numbers that can be used are stored in the key storage unit 141 at initial start-up of the communication system or the like, it is necessary to separately provide means for securely distributing a key (initial key) for initial authentication. Typically, a method of setting an initial key at the factory, a method of manually setting an initial key in each of the key managing units A and B by a system administrator, or a method of using identification information in a secure chip (not illustrated) additionally included in each of the nodes A and B as an initial key is used.

Even when the system is running, there may be a case where there are no random numbers to be shared between the key managing unit A and the key managing unit B any more as a result of an increase in the consumption of the cryptographic keys (random numbers), failure in the authentication or the like and the mutual authentication becomes difficult. There may also be a case where a new link is added between nodes that have not been connected. In such cases, the key managing unit A and the key managing unit B may be able to communicate via an existing link other than a link that directly connects the units depending on the network configuration. In particular, it is important to include alternative paths as countermeasures against DOS attacks in a quantum cryptographic communication system. In many cases, therefore, a network configuration in which alternative paths as detours are present is designed.

As described above, according to the embodiment, generation of random numbers to be shared for communication through links can be started by using alternative paths even if the random numbers to be shared for links are exhausted or even if a new link is added. Thus, this allows automatic link start-up. As a result, the availability of the communication system can be increased, the reliability thereof can be improved and the manageability and the scalability thereof can be made higher.

In a case of the key managing unit A and the key managing unit B between which a link already exits, it is desirable to perform control so as to eliminate the need for initial key exchange via an alternative path due to loss of cryptographic keys (random numbers). Such control may be a method of performing control so that the consumption of the random numbers is gradually reduced and the amount of stored random numbers is increased as follows, for example:
(First step) disable execution of applications that use many random numbers according to the remaining amount of random numbers;
(Second step) disable execution of applications that use random numbers; and
(Third step) disable use of random numbers for processes other than authentication.

Note that initial key exchange is preferably performed using the one-time pad cipher at each link in alternative paths.

Information on the security may be added for each part (partial key) of random numbers and be saved for sharing the random numbers. Examples of the information on the security include the probability of sniffing, an error rate of reproduced quantum bits and an error rate of decoy pulses. The information on the security is determined by testing respective items in detail when the random numbers to be shared are generated. Then, such information on the security may be referred to and a cryptographic key (partial key) that is preliminarily approved by the nodes 100 to satisfy a predetermined security condition may be used.

Figure 5:
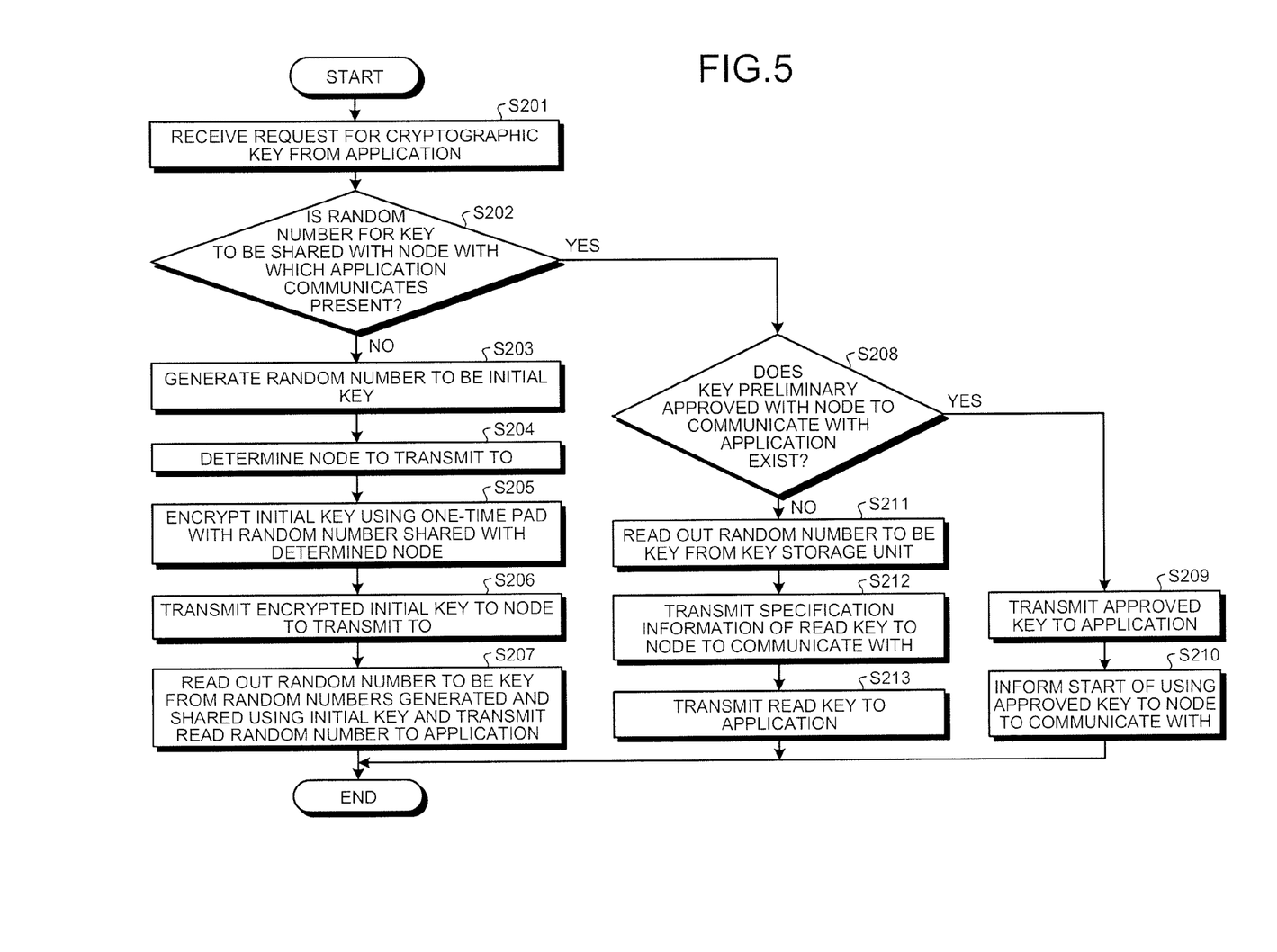
FIG. 5 is a flowchart illustrating an entire flow of a key sharing process.

FIG. 5 is a flowchart illustrating an entire flow of a key sharing process with such a configuration. Since the processing from step S201 to step S207 is similar to that from step S101 to step S107 in FIG. 4, the description thereof will not be repeated. In addition, similarly to the flowchart of FIG. 4, the flowchart of FIG. 5 can also be applied to a case where the present node 101 does not have a function of sharing random numbers with the node B and the present node 101 transfers an application cryptographic key via another node (a node D, for example) with which the present node 101 shares the random numbers.

If random numbers to be shared are stored in the key storage unit 141 (Yes in step S202), the key managing unit 120 determines whether or not an application cryptographic key that is preliminarily approved with the node B is present (step S208). If such an application cryptographic key is present (Yes in step S208), the first transmitting unit 125 transmits the approved application cryptographic key to the application 101 that is a request source (step S209). The first transmitting unit 125 informs the node B that the approved application cryptographic key is started to be used (step S210). If a preliminarily approved application cryptographic key is not present (No in step S208), processing (steps S211 to S213) similar to that from step S108 to step S110 in FIG. 4 is performed.

The application that is a request source or the like may be identified and the security of the application cryptographic key to be used may be changed according to the request source of the random numbers. For example, a part with higher security of the random numbers may be used as a cryptographic key used for communication support for mutual authentication of the key managing units 120. This process can be realized by identifying the request source application when the key managing unit 120 generates an application cryptographic key. Messages in communication through alternative paths are protected by mutual authentication. Therefore, a service request will not be tampered on the way.

An alternative path is specified by a routing function (path setting unit 126) included in the key managing unit 120. The address of a node to communicate with is already stored as path information in the path storage unit 142 at restarting and resetting of the node 100. The determining unit 123 can thus determine an alternative path by referring to the path information in the path storage unit 142. In a case where a new link is added, in contrast, the address of the node to communicate with has to be set in the path information. This is achieved by manually updating the path information by a system administrator, for example.

Lack of cryptographic keys (random numbers) occurs when the generation amount of random numbers is reduced because of sniffing and jamming, when many applications use the random numbers and when frequent key change is required (in particular, when the one-time pad cipher is used), excluding the case of lack of function.

If such phenomenon continues for a time, it is important for improving system availability to make use of another link such as an alternative path before falling into lack of random numbers. If the entire system is considered, there are cases where using alternative paths accelerates consumption of keys. However, if an alternative path is set to pass through a key managing unit 120 with low key consumption, the possibility that service can be continuously provided without increasing the cost (enhancing the key generating function (second generating unit 130) or causing failure such as temporary suspension of service due to overconsumption of random numbers) is increased for the system as a whole.

Accordingly, the path setting unit 126 may exchange status information such as the degree of storage of the random numbers with a path setting unit 126 of another node 100. In addition, the determining unit 123 may select a path by using the exchanged status information as a metric.

Furthermore, a server device (center) having a function of collecting such status information, a function of organizing path information for path selection based on the status information, and a function of distributing the path information to the key managing unit 120 of each node 100 may be included depending on the system scale, for example.

Figure 6:
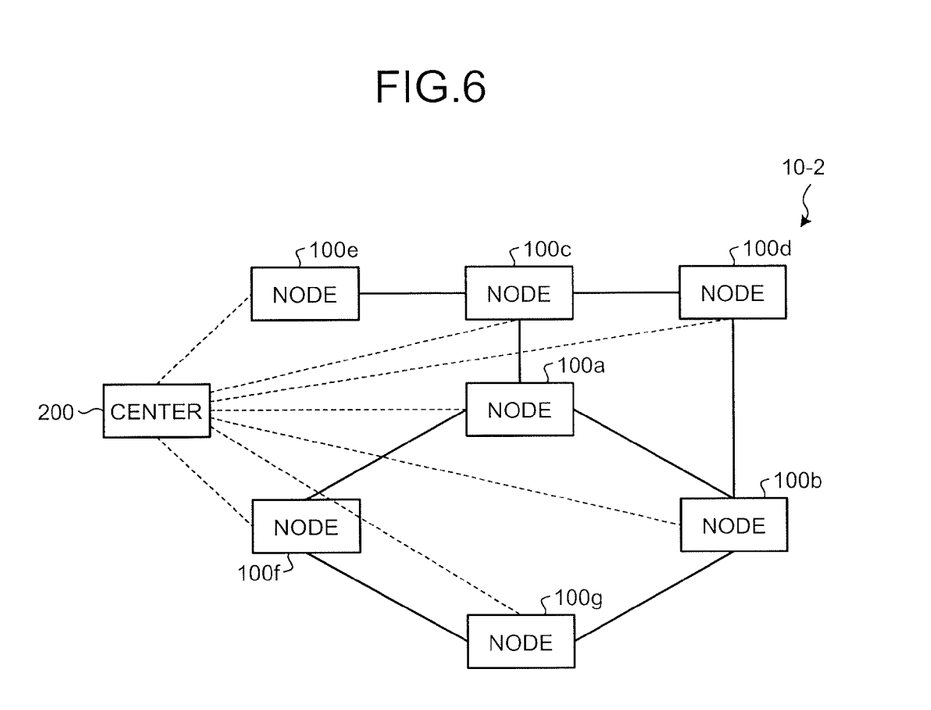
FIG. 6 is a diagram illustrating another exemplary configuration of the communication system.

FIG. 6 is a diagram illustrating an exemplary configuration of a communication system 10-2 having such a configuration. The communication system 10-2 includes a center 200 having the functions described above in addition to a plurality of nodes 100a to 100g. Broken lines in FIG. 6 represent that the center 200 is connected to the respective nodes 100 and transmits/receives various information such as status information and path information. Note that redundant centers 200 may be used so that the communication system 10-2 can be continuously used even if a problem is caused in the center 200.

The key managing unit 120 requests the center 200 to provide path information after informing the center 200 that a desired link cannot be used (that the random numbers to be shared at the link are insufficient) when searching for an alternative path. This is because path information reflecting that the desired link cannot be used needs to be obtained. The key managing unit 120 temporarily informs the center 200 that the desired link cannot be used, for example. The center 200 then transmits the path information reflecting that the desired link cannot be used, for example, to the source key managing unit 120.

With such a configuration, in a case where a link is restarted in a short time as a result of initial key exchange via an alternative path, for example, a condition in which the path information of the entire communication system 10-2 is continuously used without detecting the temporary suspension of the link may be realized. As a result, an advantage that instability in load variation of the network due to link variation or the like is less likely to be caused is also produced.

In addition, with the functions according to the embodiment, when a node 100 is newly provided, an initial key for one link out of links to which the node 100 is connected is manually set, and then initial setting for the other links is performed via an alternative path. As a result, it is possible to save start-up operation when a node is newly provided.

In order to simplify the behavior of the system, it is preferable that an application cryptographic key to be provided to the applications 101 be generated by using a random number generator at the node 100 for each request instead of being obtained from random numbers stored in the key storage unit 141. In the embodiment, the first generating unit 122 is used as the random number generator, for example. Since there is a random number generator having a random number generating rate in the order of Gbps (gigabit per second) or higher, communication can be realized while generating random numbers in real-time by the random number generator even when one-time pad cipher is used.

The generated random number is transferred to an adjacent node 100 by using the one-time pad cipher using a random number that is shared with the adjacent node and stored. Such a transfer process is repeated and the random number is ultimately transmitted to a node 100 (a final node). The final node passes the random number decoded at the final node as the application cryptographic key to the application.

In a case where the one-time pad cipher is also used for communication to transfer the random number to the final node, a required amount of cryptographic keys are transferred in advance or the cryptographic keys are transferred in real time. Since decoding or encoding is repeated for each hop, however, there may be a situation in which the cryptographic key reaches later than data encrypted using the one-time pad cipher reach the final node may be considered even when the cryptographic key is transferred in real time.

In order to be prepared for such situation, a buffer that makes the received data delayed as necessary may be provided at the receiving end. This buffer may be needed for data communication, key communication or the both. It is preferable to provide a similar function of real-time service support when the shared key is changed rapidly and frequently even for communication using the shared key cryptography.

An already shared random number exists between the present node and an adjacent node. Accordingly, transfer of a random number using the existing random number results in a decrease in the efficiency. A cryptographic key may therefore be selected from the already shared and stored random numbers for an initial link only. In other words, the first generating unit 122 may use part of the random numbers shared with an adjacent node as a cryptographic key.

The adjacent node is informed only of information representing a range or a position of the cryptographic key within the random numbers. The adjacent node selects the part from the stored random numbers by using this information. The adjacent node encrypts the cryptographic key that is the selected part by using the one-time pad cipher with a random number that is shared with a next node 100 and transmits the encrypted cryptographic key to the next node 100. Subsequently, similar processing is repeated until sharing of the random number (application cryptographic key) with a final node is achieved.

This function can also be designed and implemented so that this function can be used when it is necessary to continuously generate keys. The procedure of the application cryptographic key exchange may be performed in parallel with data communication. Even in such a case, the load for transferring a random number (cryptographic key) can be reduced by using this function, which therefore facilitates implementation of other services at a node 100 (referred to as a node A) that generates an application cryptographic key. The method of informing an adjacent node only of information representing a range or a position of a cryptographic key can be adapted to the transfer of an initial key via an alternative path described above.

The example in which a random number shared between nodes 100 is mainly applied to encryption of communication between applications has been described above. Processes to which this can be applied are not limited to encryption of communication. For example, this can also be applied to a process of encrypting and transmitting a file. Specifically, a random number to be shared can be used as a cryptographic key for file encryption in a case of encrypting a file itself and transmitting the encrypted file.

In this case, the encrypted file is saved and the cryptographic key used for the encryption is saved in other locations. Since the communication system 10 according to the embodiment is premised on a network, the encrypted file may be transferred to a destination node 100 (referred to as a node D) and saved in the node D without any change. When the cryptographic key is required for decoding the file at the node D or when the file is transferred, the cryptographic key is transferred from the node A to the node D. The above-described procedures can be applied in the transfer of the cryptographic key.

There is also a technique of performing encrypted communication for the communication, reconfiguring a file without decoding data part thereof and saving the file in the encrypted state and the cryptographic key used for the encrypted communication. In this technique, the cryptographic key for the encrypted communication can also be used as the cryptographic key for file encryption. It is therefore not necessary to provide a new function relating to generation of a cryptographic key. Moreover, since the node D only has to save the received data in the encrypted state without any change, there is a convenience that the function that is otherwise required at the transmitting side becomes unnecessary. Furthermore, according to the technique, the amount of calculation can be reduced and the system efficiency can be improved as compared to a technique of decoding encrypted data in receiving operating and encrypting the file again and saving the file in file saving operation.

When the cryptographic key changes according to the packet size or packet delimiters during the communication or when the one-time pad cipher is used, however, a cryptographic key needs to be reconstructed only from the cryptographic key for the data part. In this manner, the management of cryptographic keys at the node D becomes complicated.

Considering application to file encryption processes, a cryptographic key for encryption of a part relating to protocols and a cryptographic key for encryption of a data part may be provided separately in communication. With such a configuration, cryptographic keys for decryption (for decoding) of a file can be easily managed even the file is reconstructed and saved without decrypting the data part encrypted at the receiving end.

As described above, according to the embodiment, an initial key can be shared via an alternative path and generation of random numbers can be started using the initial key even in a case where a node is added or in a case where random numbers are excessively consumed at a node and the node cannot be used any more.

Figure 7:
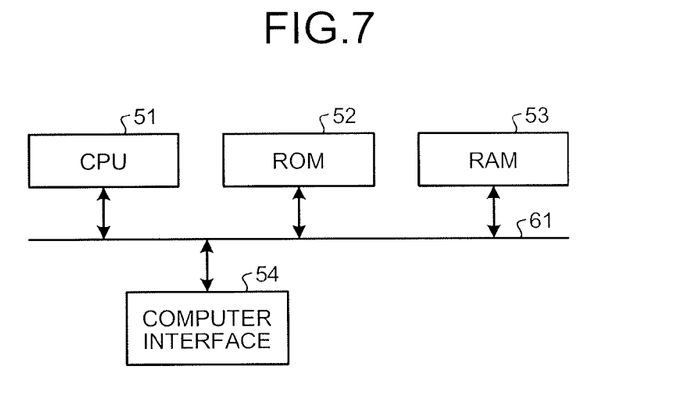
FIG. 7 is a hardware configuration diagram of a device according to the embodiment.

Next, a hardware configuration of each device (a node (key sharing device), a center (server device)) according to the embodiment will be described with reference to FIG. 7. FIG. 7 is an explanatory diagram illustrating a hardware configuration of a device according to the embodiment.

The device according to the embodiment includes a controller such as a central processing unit (CPU) 51, a storage unit such as a read only memory (ROM) 52 and a random access memory (RAM) 53, a computer interface 54 for connecting to a network and communication, an external storage device such as a hard disk drive (HDD) and a compact disc (CD) drive, a display device such as a display, an input device such as a keyboard and a mouse and a bus 61 that connects these components, which is a hardware configuration utilized by a common computer system.

Key sharing programs to be executed by the key sharing device according to the embodiment are recorded on a computer readable recording medium such as a compact disk read only memory (CD-ROM), a flexible disk (FD), a compact disk recordable (CD-R) and a digital versatile disk (DVD) in a form of a file that can be installed or executed, and provided as a computer program product.

Alternatively, the key sharing programs to be executed by the key sharing device according to the embodiment may be stored on a computer system connected to a network such as the Internet, and provided by being downloaded via the network. Still alternatively, the key sharing programs to be executed by the key sharing device according to the embodiment may be provided or distributed through a network such as the Internet.

Still alternatively, the key sharing programs according to the embodiment may be embedded on a ROM or the like in advance and provided therefrom.

The key sharing programs to be executed by the key sharing device according to the embodiment has a modular structure including the respective units described above (such as the first generating unit, the determining unit and the first transmitting unit). In an actual hardware configuration, the CPU 51 (processor) reads the programs from the storage medium and executes the programs, whereby the respective units described above are loaded on a main storage unit and generated on the main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key sharing device connected to a plurality of external devices through one or more paths, the plurality of external devices including a first device and a second device, the first device being directly connected to the key sharing device via a first path, the key sharing device comprising:
a key storage unit configured to store cryptographic keys to be shared with the external devices;
a determining unit configured to determine a second path for reaching the first device via the second device when a number of the cryptographic keys to be shared with the first device out of the cryptographic keys stored in the key storage unit is a predetermined threshold or smaller;
a first generating unit configured to generate an initial key that is a new cryptographic key to be shared with the first device;
an encrypting unit configured to encrypt the initial key by using the cryptographic key shared with the second device; and
a first transmitting unit configured to transmit the encrypted initial key to the second device with addressing the first device as destination through the second path instead of the first path.

2. The key sharing device according to claim 1, further comprising a path storage unit configured to store path information representing paths to/from the external devices, wherein
the determining unit determines the second path for reaching the first device via the second device on the basis of the path information.

3. The key sharing device according to claim 2, wherein the path storage unit stores the path information received from a server device having a function of distributing the path information.

4. The key sharing device according to claim 1, wherein the first generating unit generates any one of the cryptographic keys shared with the second device as the initial key.

5. The key sharing device according to claim 1, wherein a plurality of key storage units are provided in association with the plurality of external devices, respectively.

6. The key sharing device according to claim 1, wherein the key storage unit stores identification information of the external devices and the cryptographic keys to be shared with the external devices in association with one another.

7. A key sharing method performed by a key sharing device that connects to a plurality of external devices through one or more paths, the key sharing device including a key storage unit configured to store cryptographic keys to be shared with the external devices, the plurality of external devices including a first device and a second device, the first device being directly connected to the key sharing device via a first path, the method comprising:
- determining a second path for reaching the first device via the second device when a number of the cryptographic keys to be shared with the first device out of the cryptographic keys stored in the key storage unit is a predetermined threshold or smaller;
- generating an initial key that is a new cryptographic key to be shared with the first device;
- encrypting the initial key by using the cryptographic key shared with the second device; and
- transmitting the encrypted initial key to the second device with addressing the first device as destination through the second path instead of the first path.

8. A non-transitory computer-readable medium including programmed instructions for a computer that connects to a plurality of external devices through one or more paths, the plurality of external devices including a first device and a second device, the first device being directly connected to the key sharing device via a first path, wherein the instructions, when executed by the computer, cause the computer to function as:
- a key storage unit configured to store cryptographic keys to be shared with the external devices;
- a determining unit configured to determine a second path for reaching the first device via the second device when a number of the cryptographic keys to be shared with the first device out of the cryptographic keys stored in the key storage unit is a predetermined threshold or smaller;
- a first generating unit configured to generate an initial key that is a new cryptographic key to be shared with the first device;
- an encrypting unit configured to encrypt the initial key by using the cryptographic key shared with the second device; and
- a first transmitting unit configured to transmit the encrypted initial key to the second device with addressing the first device as destination through the second path instead of the first path.

* * * * *